United States Patent [19]
Lacey

[11] Patent Number: 4,533,281
[45] Date of Patent: Aug. 6, 1985

[54] CUTTER BLADE RETENTION

[75] Inventor: Ralph W. Lacey, Grosse Pointe Park, Mich.

[73] Assignee: Dijet Industrial Co., Ltd., Grosse Pointe, Mich.

[21] Appl. No.: 541,962

[22] Filed: Oct. 14, 1983

[51] Int. Cl.³ ............................................. B26D 1/00
[52] U.S. Cl. ...................................... 407/36; 407/40; 407/47
[58] Field of Search ...................... 407/36, 37, 38, 39, 407/40, 42, 50, 110, 47

[56] References Cited

U.S. PATENT DOCUMENTS

| | | | |
|---|---|---|---|
| 2,385,750 | 9/1945 | Weddell | 407/38 |
| 3,708,843 | 1/1973 | Erkfritz | 407/38 |
| 3,792,517 | 2/1974 | Gage | 407/37 |
| 3,839,772 | 10/1974 | Shimomura et al. | 407/36 |
| 3,847,555 | 11/1974 | Pegler et al. | 407/36 |

FOREIGN PATENT DOCUMENTS

| | | | |
|---|---|---|---|
| 793081 | 4/1958 | United Kingdom | 407/38 |
| 933613 | 8/1963 | United Kingdom | 407/38 |
| 856682 | 8/1981 | U.S.S.R. | 407/36 |

Primary Examiner—Leonidas Vlachos
Attorney, Agent, or Firm—Price, Heneveld, Huizenga & Cooper

[57] ABSTRACT

A milling cutter having blades retained against seating surfaces in cutter body slots by resilient leaf springs engaging the blade edge surface that is opposite the seating surface for the blade. The seating surfaces are each part of a tapered wedge element and a threaded adjuster extending through the wedge element into the cutter body, parallel to the wedge seating surface.

4 Claims, 3 Drawing Figures

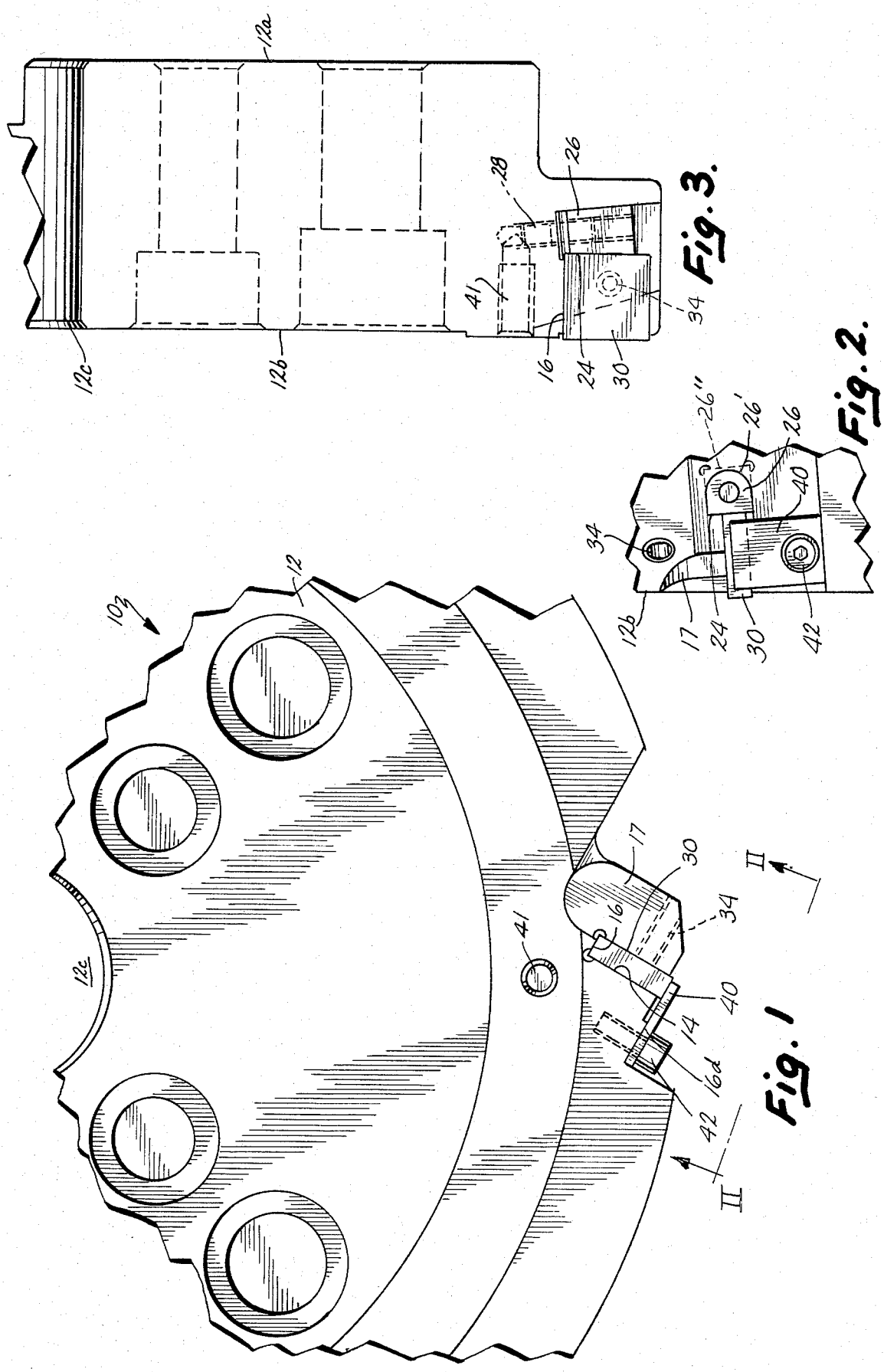

CUTTER BLADE RETENTION

BACKGROUND OF THE INVENTION

This invention relates to milling cutters, and particularly to finishing cutters.

Milling cutters having insert blades employ a variety of devices for fixedly clamping the blades into the cutter body slots. Such typically employ slanted and offset clamping screws extending through the sides of the blade into the cutter body to press it into the walls of the slot, or wedges which press against one of the two flat sides of the blade to press the blade against the bottom of the slot. Any adjustment of the blade position, as for controlled blade run out, is achieved by loosening the clamping screw or wedge, adjusting the blade position as with a shim or an adjusting screw, or hand setting to a gage, plate, or similar device, and tightening the clamping device.

Tightening of blade clamping devices creates stress which is believed to cause distortion of the cutter bodies. Additionally, retightening of the clamping device after blade adjustment can cause slight blade shift. Any such distortion and/or shift can cause the blades to not track and thereby have detrimental results during use of the cutter, particularly during finishing operations.

The use of a conventional wedge behind or in front of the blade for securing the blade has also been found to cause difficulty due to the possibility of unwanted wedge shifting as well as body distortion.

SUMMARY OF THE INVENTION

The milling cutter of this invention is particularly useful for finishing operations, retaining insert blades in the cutter pocket without the usual severe clamping force, but rather applying a resilient bias against an edge surface of the blade. The resilient bias is obtained in the illustrated cutter with a leaf spring having one end secured to the cutter body and the other end engaging an edge surface of the blade. Hence no distorting clamping stress is applied to the blade. The blade face run out can be finely varied without loosening and retightening a clamp, screw, or wedge.

This face or axial run out variation is preferably achieved with a wedge that is closely confined in a slot in the cutter body, such that it is stable.

BRIEF DESCRIPTION OF THE DRAWINGS

FIG. 1 is a fragmentary front elevational view of the novel cutter;

FIG. 2 is a fragmentary elevational view of a portion of the periphery of the novel cutter, taken in the direction indicated by the arrows II in FIG. 1; and FIG. 3 is a fragmentary edge elevational view of the novel cutter in FIGS. 1 and 2.

DESCRIPTION OF THE PREFERRED EMBODIMENT

Referring now specifically to the drawings, the novel cutter assembly 10 includes a disc-shaped cutter body 12 having a back face 12a and a front face 12b, as well as a center bore 12c (or alternatively a protruding shank) for attachment of the cutter body to a conventional spindle of a face mill. The cutter body has a plurality, e.g. two, three, four, five, six or more, of peripheral blade receiving station pockets or slots. The slots are spaced circumferentially around the cutter body, each being at the juncture of the cutter body periphery and the front face so as to communicate radially with the periphery and axially with the front face. One of these slots is shown in the drawings in detail, it being understood that the others are duplicates thereof. Each slot or station includes a bottom seat 14 extending generally radially and axially to engage a removable insert blade 30 and specifically engage one of the two parallel flat sides of the blade. Each slot also includes a locating surface 16 extending axially and facing radially outwardly, for engagement with one of the several edge surfaces of the blade. Each slot also includes a radially extending seating surface 24 for axially locating the blade to determine the blade axial run out (FIG. 2). Surface 24 comprises the front face of a novel wedge element as will be described more fully hereinafter.

The blade 30 itself typically comprises a removable body of compressed, powdered substance such as tungsten carbide, the polygonal structure having a pair of flat sides otherwise called top and bottom surfaces, and a plurality of, typically two, three or more, edge surfaces. The juncture of an edge surface wih one of the flat sides forms a cutting edge. Thus, each insert blade can have anywhere from one cutting edge to two times the number of edge surfaces, e.g. eight in the depicted blade.

Blade 30 is retained in position with one of its blade edge surfaces in abutment with locating surface 16 on the cutter body. This retention is achieved by a blade retaining spring 40 which applies a resilient biasing force against the blade edge surface opposite the blade edge surface that abuts locating surface 16. This spring is a leaf spring having one end bolted to the cutter body and specifically to a flat 16d (FIG. 1) on the cutter body, by a threaded bolt 42 extending through the spring and into a threaded socket communicant with flat 16d. The other free end of spring 40 overlaps and engages the blade edge surface opposite locating surface 16. Tightening of bolt 42 to secure spring 40 causes the spring to apply a resilient biasing force against the blade edge surface to retain the blade radially in the cutter body. The spring and bolt 42 are radially recessed within the peripheral outline of the cutter body, and the spring is axially spaced from the cutting edge to allow desired depth of cut without interference. During machining, blade 30 is axially retained against locating surface 24 by the force of the machining operation. This locating surface, extending radially of the cutter body, is the front face of a special wedge element 26, the rear surface 26' of which may be curved as depicted in solid lines in FIG. 2, or planar as depicted at 26" in phantom lines in FIG. 2. Whatever shape the back surface has, the sides are closely confined in the retaining slot. The sides of both the wedge and the slot are flat and straight. A threaded fastener 28 extends lengthwise through elongated wedge 26 (FIG. 3), into threaded engagement with said cutter body, to act between said wedge element and said cutter body. The axis of this fastener is parallel to the rear surface of the wedge and at a small acute angle to seating surface 24 and blade 30, whereby radial adjusting movement of wedge 26 will vary the run out of blade 30 axially of the cutter body. Preferably, any slack in the wedge adjuster is removed by axially extending lock screw 41 which has a conical inner end engaging the inner end of threaded fastener 28 to apply an axial locking force thereon.

Each blade slot preferably includes a shallow concave recess 17 for chip removal in conventional fashion.

If desired, an optional set screw 34 can be threadably engaged into the cutter body to extend with its inner end forming a stop adjacent and in light contact with the outer flat side of each blade to retain the blade against any tendency of movement due to blade thickness variation or variation in blade slot width. This set screw has been found useful in some cutting operations to supplement the blade securement.

The special configuration of wedge element 26, with its flat front surface 24 to serve as a seating surface, its rear surface and its pair of flat sides on this elongated body, render it particularly useful in that it adjusts or varies the blade run out readily but does not move undesireably during the cutting operation.

Although the use of the apparatus in operation will be readily apparent from the description above, such will be briefly set forth herein to assure a total understanding of the concept. Specifically, a cutter body 12 to employ the inventive arrangement includes a plurality of station slots around its periphery into which insert blades 30 are to be mounted. Each blade is positioned with one of its flat sides against the bottom seat surface 14 of its slot, one of its edge surfaces against locating surface 16 and one of its adjacent edge surfaces against seating surface 24 on the front of wedge element 26. Spring 40 is positioned and fastened by bolt 42 to the cutter body so that the free end of the spring applies a resilient restraining force against the edge surface of blade 30 opposite the seating surface 16. Wedge 26 can be radially moved by threaded element 28 using a suitable wrench to achieve the desired axial blade run out for each of the blades around the cutter body periphery. If set screw 41 is employed, it is tightened to assure removal of any slack of the threaded wedge adjuster. If screw stop 34 is employed, it is adjusted so that its axial inner end is in light abutment against the second flat side of the blade. The unit is then ready for operation. The blade will be at the desired predetermined rake angle provided, e.g. such as the negative rake angle depicted in FIG. 2. The apparatus has been found during experimental usage to be particularly advantageous for finishing operations.

It is conceivable that certain minor variations may be made in the apparatus depicted as illustrative, within the scope of the invention set forth. Therefore, the inventive concept is intended to be limited only by the scope of the appended claims and the reasonable equivalents thereto, rather than to the specific embodiment depicted for illustrative purposes.

The embodiments of the invention in which an exclusive property or privilege is claimed are defined as follows:

1. A milling cutter having insert blades free of clamping stress distortion and capable of blade axial runout variation without loosening and retightening of a clamp, comprising:

in combination with a cutter body having a back face, a front face, a generally cylindrical periphery, a center mounting bore or shank, and a plurality of circumferential, blade-receiving slots at the juncture of said periphery and said front face, to extend radially through said periphery and axially through said front face; each slot including a bottom seat, an axially extending, radially facing blade-locating surface, and a radially extending adjustable blade-seating surface; polygonal blades in said slots, each blade having a pair of flat sides, a plurality of edge surfaces and at least one cutting edge; one of said blade flat sides engaging said slot bottom seat, one of said blade edge surfaces abutting said blade-locating surface, and one of said blade edge surfaces abutting said blade-seating surface; a blade-retaining spring attached to said cutter body and bearing against a blade edge surface opposite said locating surface to retain said blade by a resilient biasing force; said spring being a leaf spring, means to secure one end of said spring to said cutter body and the other end bearing against said blade edge surface, and applying the sole radial retention for said blade, said blade being free of clamping force stress and being adjustably movable while retained by said spring; and means to adjust said blade-seating surface to vary the axial runout of said blade relative to said cutter body, while retained by the bias of said spring.

2. The milling cutter in claim 1 wherein said leaf spring is secured to said cutter body with a fastener; and said leaf spring and said fastener are radially recessed below the peripheral outline of said cutter body.

3. The milling cutter in claim 1 including a set screw stop mounted in said body to have an end adjacent the blade flat side opposite the blade flat side on said slot bottom.

4. The milling cutter in claim 1 characterized by said seating surface being the front tapered face of a wedge member, said wedge member having rear surface abutting a cooperative configured portion of said cutter body, a pair of confined side surfaces, and a threaded adjuster element between said wedge member and said cutter body for longitudinal shifting of said tapered face to cause controlled axial run out of the blade against the bias of said spring.

* * * * *